(12) United States Patent
Pragya

(10) Patent No.: US 11,354,139 B2
(45) Date of Patent: Jun. 7, 2022

(54) INTEGRATED CODE INSPECTION FRAMEWORK AND CHECK VARIANTS

(71) Applicant: SAP SE, Walldorf (DE)

(72) Inventor: Pragya, Gurgaon (IN)

(73) Assignee: SAP SE, Walldorf (DE)

( * ) Notice: Subject to any disclaimer, the term of this patent is extended or adjusted under 35 U.S.C. 154(b) by 46 days.

(21) Appl. No.: 16/714,506

(22) Filed: Dec. 13, 2019

(65) Prior Publication Data

US 2021/0182083 A1    Jun. 17, 2021

(51) Int. Cl.
G06F 9/44 (2018.01)
G06F 9/445 (2018.01)
G06F 11/36 (2006.01)

(52) U.S. Cl.
CPC ...... *G06F 9/44589* (2013.01); *G06F 11/3664* (2013.01)

(58) Field of Classification Search
CPC ............. G06F 9/44589; G06F 11/3664; G06F 11/3668; G06F 11/3672; G06F 11/3684; G06F 11/3688; G06F 11/3692
USPC ........................................................ 717/125
See application file for complete search history.

(56) References Cited

U.S. PATENT DOCUMENTS

| | | | |
|---|---|---|---|
| 6,473,896 B1 * | 10/2002 | Hicken | G06F 8/20 717/125 |
| 6,513,154 B1 * | 1/2003 | Porterfield | G06F 8/20 717/101 |
| 7,478,367 B2 | 1/2009 | Morgan et al. | |
| 9,361,068 B2 | 6/2016 | Frenkiel et al. | |
| 2005/0120276 A1 * | 6/2005 | Kolawa | G06F 11/3624 714/38.1 |
| 2005/0166193 A1 * | 7/2005 | Smith | G06F 8/75 717/143 |
| 2006/0064677 A1 * | 3/2006 | Bickson | G06F 11/3664 717/124 |
| 2006/0156286 A1 * | 7/2006 | Morgan | G06F 8/51 717/124 |
| 2006/0293934 A1 | 12/2006 | Tsyganskiy et al. | |

(Continued)

OTHER PUBLICATIONS

Title: The concept of dynamic analysis author: T Ball published on 1999.*

(Continued)

*Primary Examiner* — Chameli Das
(74) *Attorney, Agent, or Firm* — Klarquist Sparkman, LLP

(57) ABSTRACT

An integrated code inspection framework using check variants is provided herein. Integrated code inspection can include associating a check variant with a development object in a development project. Additionally, a check variant can be associated with a development project. A check variant associated with a development project can cascade to development objects in the development project. A check variant associated with a development object can cascade to related development objects, based on their hierarchical relationship. A check variant can be executed against a development object to identify code which triggers check rules of the check variant. The check variants executed can come from the development project or related development objects based on the cascade of check variants. Results of the code inspection via the check variants can be aggregated and displayed in a user interface, and integrated with the code of a development object.

20 Claims, 8 Drawing Sheets

(56) References Cited

U.S. PATENT DOCUMENTS

| | | | | |
|---|---|---|---|---|
| 2008/0071711 | A1* | 3/2008 | Zhang | G06K 9/6257 |
| | | | | 706/20 |
| 2008/0240504 | A1* | 10/2008 | Grosvenor | G06N 5/003 |
| | | | | 382/103 |
| 2010/0058296 | A1* | 3/2010 | Nattinger | G06F 11/323 |
| | | | | 717/125 |
| 2010/0198844 | A1* | 8/2010 | Ribbe | G06F 8/35 |
| | | | | 707/755 |
| 2012/0089964 | A1* | 4/2012 | Sawano | G06F 11/3688 |
| | | | | 717/124 |
| 2017/0364435 | A1* | 12/2017 | Adinarayan | G06F 11/3688 |
| 2018/0067837 | A1 | 3/2018 | Singh et al. | |
| 2018/0089066 | A1* | 3/2018 | Barnett | G06F 11/3664 |
| 2019/0243613 | A1 | 8/2019 | Pragya et al. | |

OTHER PUBLICATIONS

Title: Code review quality: How developers see it author: O Kononenko, published on 2016.*

Title: Scc: Semantic context cascade for efficient action detection, Author: FC Heilbron et al., published on 2017.*

Title: Cascaded Refactoring For Framework Evolution, author: Greg Butler et al., published on 2001.*

"All the features you would expect," JArchitect, available at: https://www.jarchitect.com/features, 6 pages, retrieved on Nov. 26, 2019.

"Code Review Benefits," devart, available at: https://www.devart.com/review-assistant/learnmore/benefits.html, 3 pages, retrieved on Nov. 26, 2019.

"Code Review Tool—Review Assistant," devart, available at: https://www.devart.com/review-assistant/, 8 pages, retrieved on Nov. 26, 2019.

"Developer Assistance Tools," Codetrails, available at: https://www.codetrails.com/developer-assistance-tools/, 3 pages, retrieved on Nov. 26, 2019.

"Generate Custom Reports From your Build Process," JArchitect, available at: https://www.jarchitect.com/buildprocess, 3 pages, retrieved on Nov. 26, 2019.

"Getting Started with JArchitect: How do I analyze my Java applications using Jarchitect?" JArchitect, available at: https://www.jarchitect.com/GettingStarted#Part1, 6 pages, retrieved on Nov. 26, 2019.

JArchitect website, available at: https://www.jarchitect.com/, 5 pages, retrieved on Nov. 26, 2019.

"Pull Request Analysis," sonarQube, available at: https://docs.sonarqube.org/latest/analysis/pull-request/, 4 pages, retrieved on Nov. 26, 2019.

"Review Assistant and Code Compare now support Visual Studio 2019," devart, available at: https://blog.devart.com/review-assistant-and-code-compare-now-support-visual-studio-2019.html, 3 pages, retrieved on Nov. 26, 2019.

SonarQube website, available at: https://www.sonarqube.org/, 4 pages, retrieved on Nov. 26, 2019.

* cited by examiner

INTEGRATED CODE INSPECTION FRAMEWORK AND CHECK VARIANTS

BACKGROUND

Checking program code can be a significant part of the software development lifecycle. As program code has increased in complexity, so has program code checking. Automating program code testing can be beneficial to manage the testing complexity. However, automated program code checking can be difficult or time consuming to execute, and may require separate systems for executing automated testing processes. Further, automated checking processes may only review or test for specific problems, and so many different or separate automated checking processes may be needed for a more complete review or test of the program code. Such different or separate checking processes may individually require separate execution, which can be a further burden on developers. Such difficulties encourage developers to delay automated checking, or skip such checking processes altogether, which can lead to significant re-writing of program code late in the development cycle, including after other checking or testing has been completed, which can lead to software development delays, the introduction of new errors, or duplication of checking or testing efforts. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system of code inspection and check variants is provided herein. A check variant can be associated with a first development object via first metadata. The development object can be hierarchically related to a second development object. The check variant can be associated with the second development object via second metadata based on the hierarchical relationship to the first development object. A code review request can be received. The code review request can identify the second development object for testing. The second metadata of the second development object can be accessed to identify the check variant. The check variant can include one or more check rules. Program code of the development object can be accessed. The check variant can be executed against the program code. Executing the check variant against the program code can include applying the one or more check rules of the check variant to the code and identifying code segments of the code which trigger at least one of the one or more check rules. References to the identified code segments can be stored in association with the development object. References to triggered check rules for the identified code segments can be stored in association with the development object. A check status of the development object can be updated based on the check variant execution. The updated check status can be displayed. A count of the identified code segments can be displayed. The identified code segments can include noncompliant code segments based on the check rules.

One or more non-transitory computer-readable storage media storing computer-executable instructions for causing a computing system to perform a method of code inspection is provided herein. A check request can be received. The check request can include a development object identifier. The development object can be accessed via the development object identifier to determine an associated check variant. The check variant can be associated with the development object via a development project including a hierarchical arrangement of development objects. The check variant can be accessed to identify one or more check rules. The one or more check rules of the check variant can be applied to program code of the development object. The application of the one or more check rules can identify code segments that trigger the applied check rule. Check results can be generated and can include the identified one or more code segments and associated triggered check rules. Generating the check results can include setting a check status of the development object based on the check results. The check results can be stored in association with the development object. At least a portion of the check results can be displayed. The portion of the check results can include the check status.

A method of code inspection is provided herein. A code review request can be received, and the code review request can identify a code module. An associated check variant can be identified, and the check variant can include one or more code review rules. The check variant can be executed against the code module to identify code lines which trigger one or more code review rules in the check variant. Code line identifiers of the identified code lines and code review rule identifiers of the code review rules triggered by the code lines can be stored. A given code line identifier can be stored in association with one or more given code review rule identifiers of code review rules triggered by the given code line. An associated status of the code module can be updated based on the check variant execution.

The foregoing and other objects, features, and advantages of the invention will become more apparent from the following detailed description, which proceeds with reference to the accompanying figures.

DETAILED DESCRIPTION

Example 1—Overview

Figure 1A:
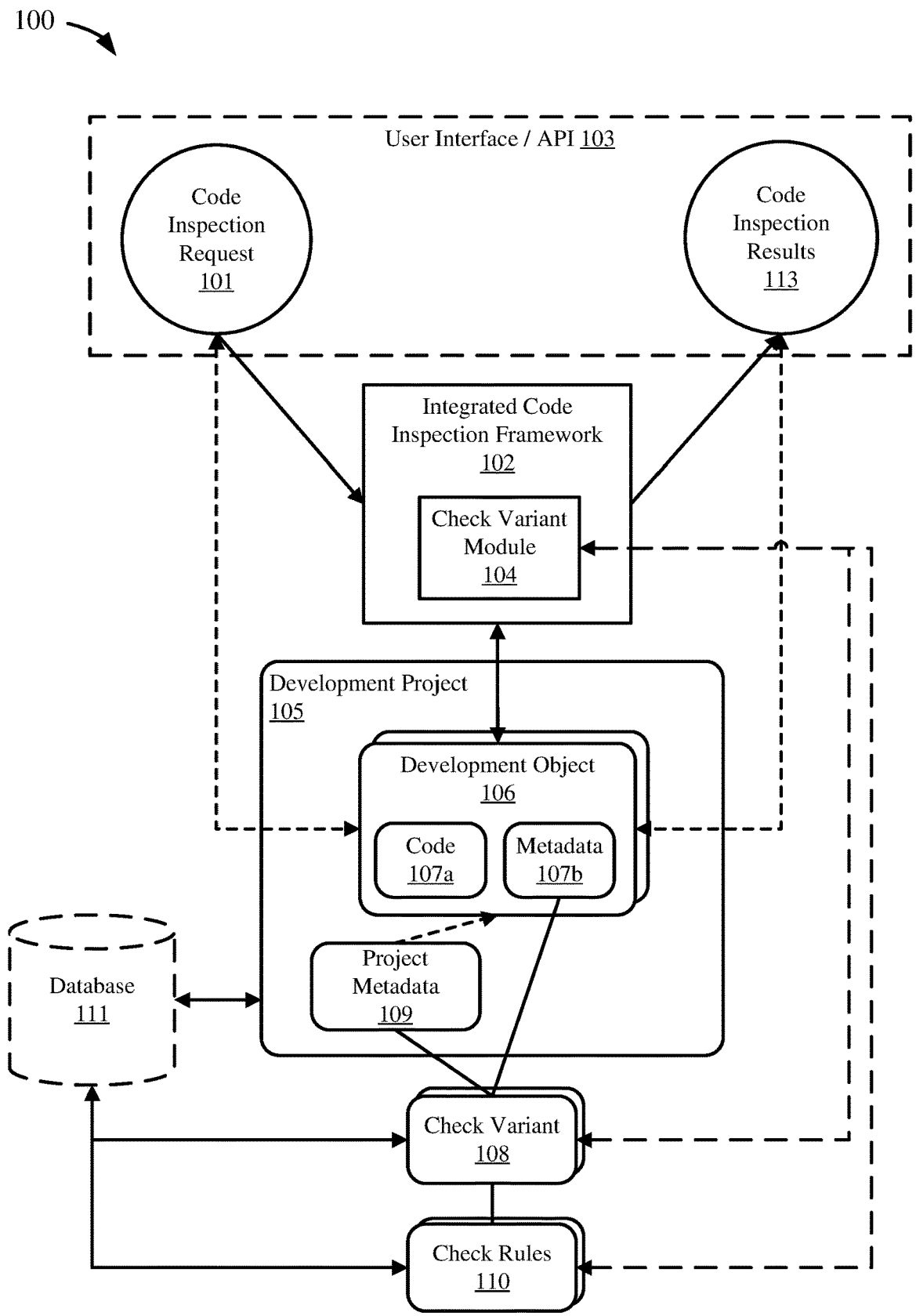
FIG. 1A is a block diagram of an example system implementing integrated code inspection via check variants.

The ever-increasing use of software across industries creates new challenges as software changes with increasing speed and quality demands increase. Software code inspection and review can be an important part of the software development life cycle, however there are many challenges in automating or semi-automating code inspection.

Often, code inspection tools can be executed as a separate transaction, where a developer can run code inspection checks against source code using a stand-alone or separate tool. Further, such stand-alone tools are often pre-defined, lacking user-specified or developed inspection routines. Thus, generally there is no provision to run a code inspection tool with user-specified analytical routines in or through a development environment. Because the inspection is a separate transaction, it can take significant effort, time, and resources, to execute separate inspections for all individual code objects in a development project. For this reason, developers generally execute these checks after manual development/unit testing is completed, if they run such checks at all.

Such delays or gaps in the execution of code inspection checks can lead to significant re-writing of code when an error is found, which can significantly delay and/or increase costs of the software development. As the testing is generally already completed by this time, correcting discovered errors would lead to retesting, including functionality and manual development/unit testing, further increasing the cost and time to complete.

Further, code inspection can sometimes raise issues which require significant restructuring of the code to resolve. Delays in code inspection can thus lead to late identification of the need for code restructuring, which can lead to either significant delays, in addition to the costs of restructuring, or might lead to developers or testers agreeing to skip restructuring with an exemption, such as from a project leader or architect. Such exemptions may be granted to save the project timeline; however, the software may then be delivered with exceptions in a non-standard or non-quality format. Such errors may then be perpetuated later, causing difficulties in code maintenance or development of new or additional modules.

The integrated code inspection framework disclosed herein can help alleviate such concerns, and can resolve the limitations of existing code analysis tools. The integrated code inspection framework targets to improve code quality of deliverable software by addressing these limitations.

The integrated code inspection framework can enhance an integrated development environment (IDE) or other code development program to alleviate the concerns previously mentioned. For example, the integrated code inspection framework can allow for assignment of a check variant to a development object or development package. This variant would be used to run SCI whenever developer executes SCI for the individual object.

Further, the integrated code inspection framework can include a button for one-click code inspection execution, with either a default and/or a user-specified check variant. The integrated code inspection framework can add functionality for displaying code inspection results (e.g. a message count such as n errors and in warnings, etc.). Such a display can enable developers and testers to have a clearer view or understanding of the code quality while viewing the code.

The integrated code inspection framework can add functionality for an additional status attribute, which can be attached to or associated with a particular code object. This code inspection status can show the integrated code inspection framework execution or run status (e.g. Compliant, Non-Compliant, or Not Executed, etc.). This code inspection status could be displayed, as well, such as along with the code inspect results. In this way, developers, architects, testers, or project managers can readily view the code health by looking at the code's status.

The integrated code inspection framework can add functionality for highlighting portions of code, such as with color coding, according to the code inspection results. Further, the integrated code inspection framework can add functionality for providing detailed inspection results associated with particular portions of inspected code, such as by clicking on a code portion to display code inspection error/warning details, such as reasons for the error/warning, and/or suggestions or proposals for correcting the code.

These features of the integrated code inspection framework generally empower developers, testers, architects, project leaders, and others, with early detection and easy identification of code health issues.

Code quality can be an important aspect of a software development project. The integrated code inspection framework can provide the benefits of early error detection and simplified identification of a wide variety of code quality issues. The integrated code inspection framework integrates the development tools and code inspection functionality, along with user-specified check variants, making such tools even more powerful.

The integrated code inspection framework can include the following advantages:

increased ease and speed with which to execute code inspection by a developer or tester, encourage early and often code inspection.

reduced efforts in identifying errors or quality issues, as the integrated code inspection framework provides such information directly in the code display (e.g. a heads-up display).

reduced efforts in correcting or changing identified code errors by highlighting the identified code portions directly and displaying error/warning details and suggested corrections or changes.

inspection status of code can highlight the code module for developers, testers, quality managers, project leaders, architects, etc., which can lead to corrective action being taken faster and earlier in the development process, thus, generally improving the overall quality of the deliverable.

reduced code inspection execution effort as the developer need not go to a separate tool to run a separate transaction every time a change is made in the code.

reduced delay in code inspection execution runs can lead to early detection of errors/warnings, which can further lead to reduction in rework effort.

reduced number of exceptions requested for code as the early detection leads to early correction.

The integrated code inspection framework and check variant functionality, and other code analysis functionality as described herein, can be provided in integrated development environments (IDEs), software development software, data integration software, or other code analysis software systems. Examples of such tools are: SAP SCI™ technology, and SAP ABAP™ technology, all by SAP SE of Walldorf, Germany.

Example 2—Example Integrated System that Executes Check Variants Against Development Objects FIG. 1A is a block diagram of an example system 100 implementing integrated code inspection via check variants. An integrated code inspection framework 102 can enhance activation of code inspection or testing to generate code inspection results 113, which can identify one or more code segments in program code 107a of a development object 106 based on one or more check variants 108. The integrated code inspection framework 102 can be integrated in an application, such as in an IDE or with a user interface (e.g. 103), or it can provide, in some embodiments, code inspection functionality directly, including through or as a service or a microservice.

The integrated code inspection framework 102 can receive a code inspection request 101. The request 101 can be a function call or can be made through an API or other interface (e.g. 103) of the integrated code inspection framework 102. In some embodiments, the request 101 can be a trigger which initiates functionality in the integrated code inspection framework 102, such as based on an input or a context change (e.g. in an IDE or other code viewer or editor).

The code inspection request 101 can include one or more variables for generating the requested code inspection results 113. For example, the request 101 can include a reference to a development object 106 on which to perform code inspection. Such a reference can include a development object identifier or a location for the development object 106, such as a database 111 storing the development object (and can further include identifiers or locations for the development object within the database), or a combination thereof. In some embodiments, the request 101 can include the development object itself, such as stored in a data structure or file.

Further, the code inspection request 101 can include a reference, identifier, and/or location to a development project 105, which can include an identifier or location for the development object 106. In some embodiments, the development project 105 can provide an index or other structure for identifying or accessing one or more development objects 106.

Additionally or alternatively, the code inspection request 101 can include a reference to one or more check variants 108, which can include an identifier or location for the check variants. In some embodiments, the request 101 can include the check variants, such as stored in a data structure or file.

In some embodiments, request 101 inputs, such as the development object 106, can be determined based on a context of the integrated code inspection framework 102 when it receives the request. For example, if the request 101 is generated in an IDE to trigger the integrated code inspection framework 102, such inputs (e.g. development object 106 and/or other inputs) can be obtained for the request or the integrated code inspection framework by the context of the request in the IDE.

The code inspection request 101 can also include one or more configurable configuration settings or options, such as a value indicating a preferred type of results 113 report, an indicator for availability of a check variant 108 applicable to the request 101, a categorization variable for detected errors in a development object (e.g. 106), or other settings or variables.

The integrated code inspection framework 102 can access a development object 106 for generating code inspection results 113 as described herein. The development object 106 can be obtained from a database 111, such as based on the code inspection request 101. In some embodiments, the integrated code inspection framework 102 can access multiple development objects 106, such as based on the code inspection request 101.

The development object 106 can include program code 107a and metadata 107b. The development object metadata 107b can include a reference or other indicator to one or more check variants 108. In this way, a check variant can be associated with a development object 106. The integrated code inspection framework 102 can access the metadata 107b of the target development object 106 to determine a check variant (or multiple check variants) to use in inspecting the program code 107a.

The development objects 106 can be members of or otherwise be associated with a development project 105. In this way, a development project 105 can include one or more development objects 106. A development project can include project metadata 109. The project metadata 109 can include information about the development objects 106 in the development project 105, such as information regarding an organization, hierarchy, or interrelationship of the development objects. Additionally or alternatively, the project metadata 109 can include references or other identifiers to one or more check variants 108. In this way, check variants 108 can be associated with a development project 105, and generally associated with the development objects 106 of the development project.

A check variant 108 can identify or otherwise be associated with one or more check rules 110. The integrated code inspection framework 102 can access the check rules 110 through their associated check variant 108. For example, a check variant 108 can provide an identifier for a check rule 110 to the integrated code inspection framework 102, which can then retrieve the check rule for use in code inspection of program code 107a in a development object 106.

The integrated code inspection framework 102 can include a check variant module 104. The check variant module 104 can access check variants 108 (e.g. as identified by metadata 107b, 109 related to development objects 106 and/or development projects 105) and/or check rules 110 (e.g. as identified by check variants). The check variant module 104 can, in some embodiments, execute a check variant 108 against program code 107a of a development object, or directly execute check rules 110 against the program code, as identified by a check variant.

The development project 105, development objects 106, check variants 108, and/or the check rules 110 can be stored and made available through a database 111, or other data storage or warehousing system.

The code inspection results 113 can be provided through a user interface/API 103, such as by displaying a list or report of detected errors or triggered check rules, or by providing a file or data structure(s) of the detected errors via an interface, such as in a return from a service or function call, or a messaging system.

In practice, the systems shown herein, such as system 100, can vary in complexity, with additional functionality, more complex components, and the like. For example, there can be additional functionality within the integrated code inspection framework 102. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instructions for implementing the integrated code inspection framework 102, the input, output and intermediate data of running the integrated code inspection framework 102, or the database 111 or the user interface/API 103, and the like can be stored in one or more computer-readable storage media or computer-readable storage devices. The technologies described herein can be generic to the specifics of operating systems or hardware and can be applied in any variety of environments to take advantage of the described features.

Figure 1B:
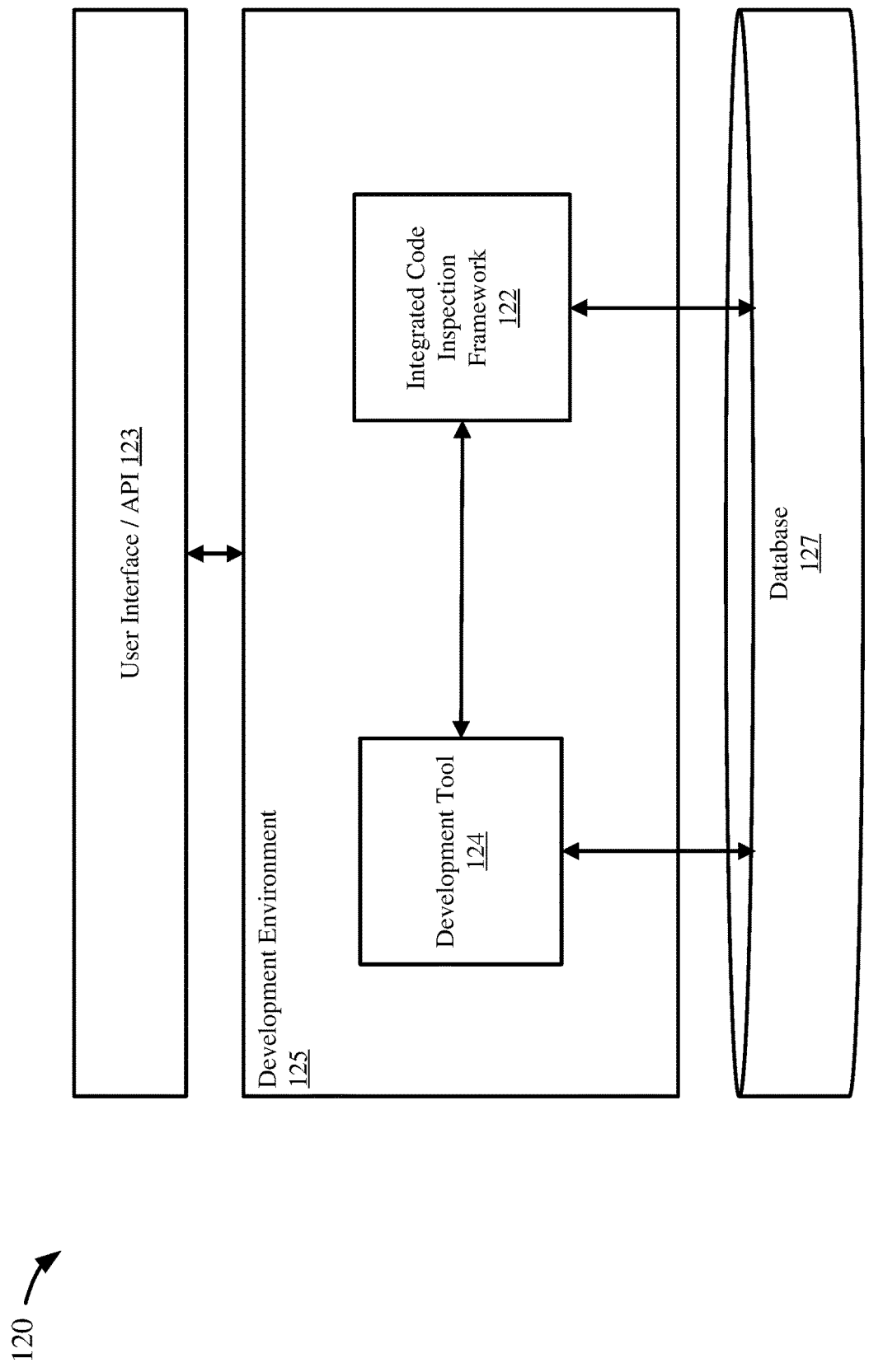
FIG. 1B is a block diagram of an example system implementing an infrastructure with integrated code inspection and check variants.

Example 3—Example Infrastructure of an Integrated Code Inspection Framework and Check Variants FIG. 1B is a block diagram of an example system 120 implementing an infrastructure with integrated code inspection and check variants, as described herein.

An integrated code inspection framework 122 can be integrated with a development tool 124, such as an IDE. The integrated code inspection framework 122 can be integrated with the development tool 124 within or through a development environment 125. For example, the integrated code inspection framework 122 can be a service or microservice available to the development tool 124 in the development environment 125. The development environment 125 can be accessible through a user interface/API 123, which can provide further interface or interaction functionality for the development tool and/or the integrated code inspection framework 122. Further, a database layer 127 can be available for access and use by the development tool 124 and/or the integrated code inspection framework 122, such as for storage and maintenance of program code and inspection results.

Figure 2:
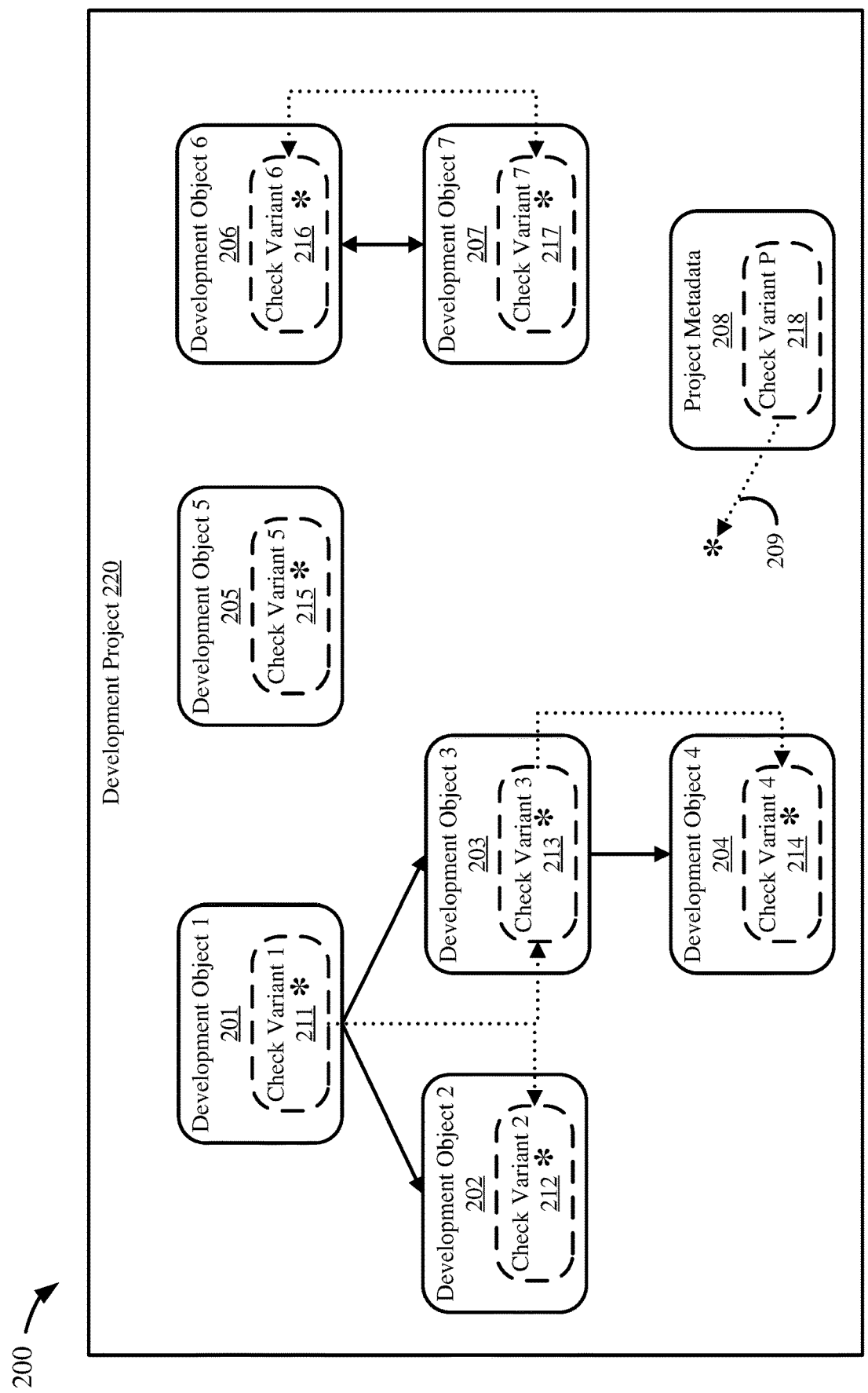
FIG. 2 is an entity diagram depicting a development project, development object, and check variant arrangement.

Example 4—Example Development Project, Development Object, and Check Variant Arrangement FIG. 2 is an entity diagram depicting a development project, development object, and check variant arrangement 200. An integrated code inspection framework, as described herein, can inspect program code in development objects 201-207 using check variants 211-218, as similarly described and shown in FIGS. 1A-B.

A development project 220 can include one or more development objects 201-207. The development objects 201-207 in a development project 220 can be interrelated. Interrelated development objects can be arranged in a hierarchy or other organization indicating the relationship between development objects. For example, Development Object 1 201 can be related to Development Object 2 202 and Development Object 3 203. Development Object 1 201 can be related by calling, invoking, incorporating, or otherwise referencing or being associated with Development Objects 2 and 3 202, 203. Further, Development Object 2 203 can be similarly related to Development Object 4 204.

In some cases, a development object may not be related to other development objects, such as Development Object 5 205.

In some cases, development objects may be bidirectionally related. For example, Development Object 6 206 can be related to Development Object 7 207, which can similarly be related back to Development Object 6. In such cases, for example, Development Object 6 206 can call or invoke functionality in Development Object 7 207, while Development Object 7 can also call or invoke functionality in Development Object 6.

The development objects 201-207 can be associated with check variants 211-217. Generally, a development object can include a reference to one or more check variants. The association between a development object and a check variant can be user-configurable. For example, a user can select or otherwise identify one or more check variants to associate with a given development object. Multiple development objects can be associated with the same check variant. For example, Check Variant 1 211 can be the check variant associated with Development Object 1 201, and may reference the same underlying check variant as Check Variant 5 215 of Development Object 5 205.

Additionally or alternatively, check variants 211-217 can be associated with development objects 201-207 based on the interrelationships between development objects. For example, Check Variant 1 211 of Development Object 1 201 can also be associated with Development Objects 2 and 3 202, 203, based on the hierarchical relationship between the development objects. Such an association can happen automatically, such as when Check Variant 1 211 is set for Development Object 1 201 (e.g. either by a user or by another automatic process). In this way, check variants can cascade to additional related development objects. This check variant cascade can be additive or supplantive. For example, Check Variant 1 211 can cascade and add one or more check variants to Check Variant 2 212 and Check Variant 3 213. Additionally or alternatively, Check Variant 1 211 can cascade and supplant or replace Check Variant 2 212 and/or Check Variant 3 213. Configurable settings can be available to determine if a check variant supplants or adds to a development object, either at the development object level or the development project level.

A check variant can cascade throughout an entire relationship hierarchy. For example, Check Variant 1 211 can cascade to Check Variant 3 213 based on the relationship between Development Object 1 201 and Development Object 3 203, and then can further cascade to Check Variant 4 214, based on the relationship between Development Object 3 203 and Development Object 4 204.

Bidirectionally related development objects 206, 207 can have their check variants (e.g. 216, 217) cascade in either direction, depending on to which development object a change to a check variant is made.

In some embodiments, check variants may cascade between related development objects regardless of the direction of the relationship (e.g. regardless of which development object calls which).

A development project 220 can include project metadata 208, which can include a reference to one or more check variants 218. Check Variant P 218 can be a project-level check variant, which can be applied 209 to development objects 201-207 in the development project 220, as similarly to development object check variants 211-217 (e.g. additively or supplantively).

In this way, check variants can be automatically applied to all development objects related to the target of the check variant. Check variants at the project level (e.g. 218) can thus be automatically applied to all development objects 201-207 in the development project 220 (e.g. such as by a project manager or quality control specialist) and check variants at the development level (e.g. 211) can be automatically applied to all development objects at the same development level (e.g. by a lead developer or unit developer or tester).

Figure 3:
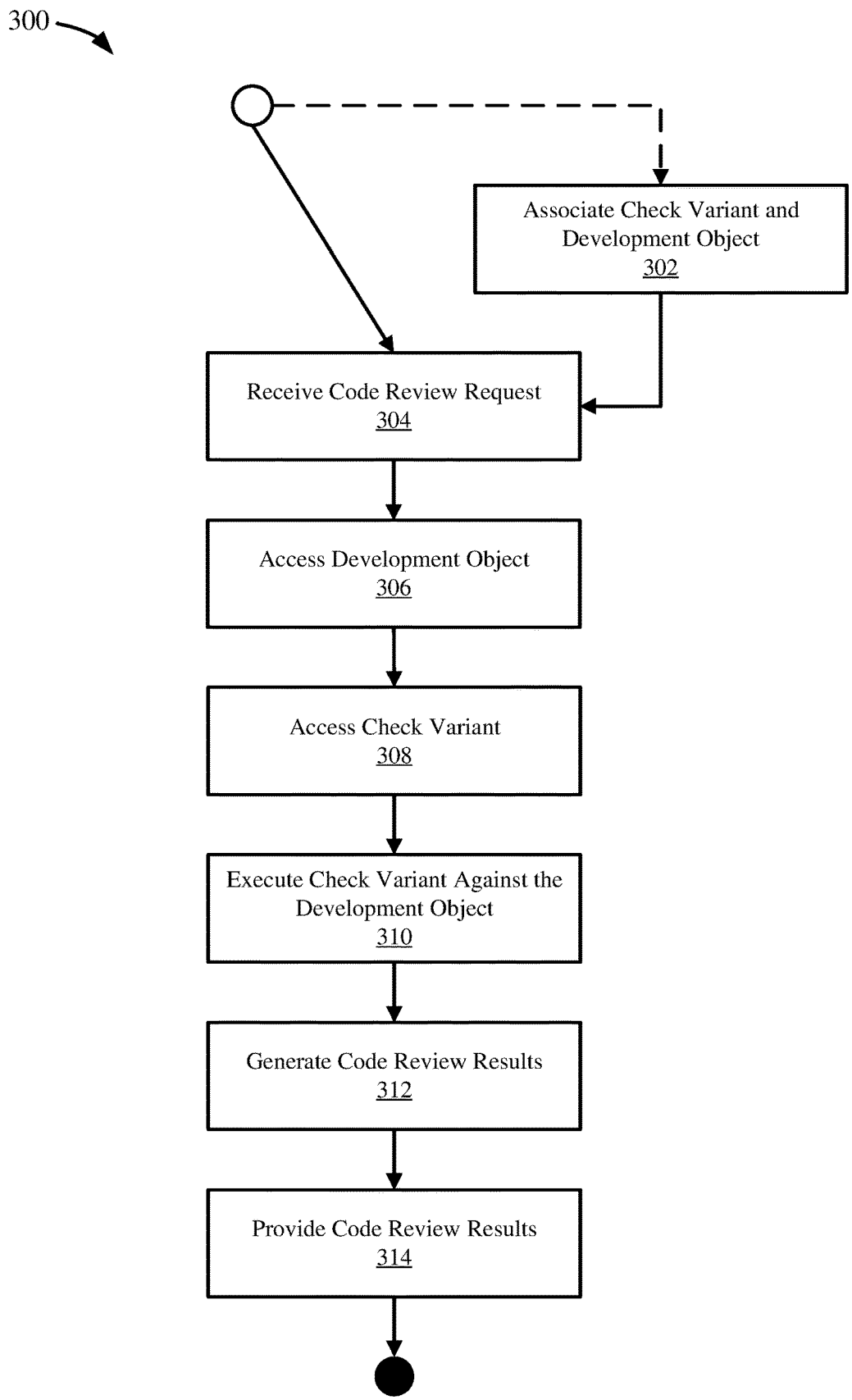
FIG. 3 is a flowchart of an example method of associating and executing a check variant against a development object.

Example 5—Example Method that Associates and Executes Check Variants Against Development Objects FIG. 3 is a flowchart of an example method 300 of associating and executing a check variant against a development object, and can be implemented, for example, by the system described in FIGS. 1A-B and using development objects as described in FIG. 2.

At 302, a check variant can be associated with a development object. Associating a check variant with a development object at 302 can include storing an identifier for a check variant in metadata of the development object. In some cases, multiple check variants can be associated with the development object.

A check variant can be associated with a development object at 302 by user selection, by attribution through a development project (e.g. from project metadata), by association of a check variant with a related development object which cascades to the current development object, or a combination thereof, and the like.

In some embodiments, associating the check variant at 302 can be performed in response to a code review request, such as can be received at 304. In such cases, the code review request can include a check variant (e.g. identifier) to associate with the target development object. In other cases, receipt of a code review request can trigger a process to update all development objects with check variants based on their interrelationships with other development objects and/or their development project.

At 304, a request for code inspection or review can be received. A code review request can include one or more variables or input arguments, such as described herein.

For example, a code review request can include a target development object or an identifier or location for a development object, an identifier or location for a development project, or other variables or settings for inspecting code in a development object. The code review request can be initiated by a user interface activation, API or other function/service call, or a context of an application (e.g. a trigger).

At 304, a hierarchical representation of the search definitions in the search definition set can be generated. Generating the hierarchical structure can include identifying the search definitions in the search definition set and arranging the search definitions based on dependencies between them. Generally, the hierarchical representation can include nodes or other data structure, which represent the search definitions, which are arranged based on the dependencies between their respective search definitions.

At 306, the target development object can be accessed. The development object can be accessed at 306 based on the received code review request from 304, which can include de-referencing an identifier or pointer, accessing a data storage facility or repository, data file, data structure, or memory location. In some cases, the development object can be available in local memory, and so readily accessible. Accessing the development object at 306 can include accessing the program code of the development object and the metadata of the development object, which can include loading the program code and/or the metadata into local memory.

At 308, a check variant can be accessed. The check variant can be accessed at 308 based on the development object accessed at 306, which can include de-referencing an identifier or pointer, accessing a data storage facility or repository, data file, data structure, or memory location, such as can be obtained from metadata of the development object. In some cases, the check variant can be available in local memory, and so readily accessible. Alternatively or additionally, the check variant can be accessed at 308 based on the received code review request from 304. Accessing the check variant at 308 can include obtaining one or more check rules or identifiers for check rules available through the check variant. In some cases, multiple check rules can be accessed at 308, as identified by the development object from 306 and/or the code review request from 304.

At 310, the check variant (or variants) can be executed against the development object. Generally, executing the check variant against the development object at 310 includes applying one or more check rules identified by the check variant against the program code of the development object. In some embodiments, the check rules of a check variant can be applied iteratively to the program code of the development object. In alternative or additional embodiments, the check rules can be applied simultaneously or in parallel against the program code of the development object. The check rules can be applied against the program code by testing portions of the program code against the check rules. For example, a line or segment of code can be compared against a check rule(s) to determine if the rule is triggered. Generally, when a check rule is triggered, that indicates the program code (e.g. line of code or code segment) has an error or possible error and warrants changes or further review. Thus, the program code can be traversed by line or code segment, with each portion being tested against the check rules of the check variant (or variants).

When a check rule is triggered (e.g. a portion of the code meets the check rule), the portion of the code can be flagged as triggering a check rule. Flagging the code can include identifying the check rule and/or check variant which was triggered. Flagging can include setting a flag to indicate a check rule that was triggered and the portion of code which triggered it. Separate flags can be set for separate portions of code and their corresponding rule(s) triggered. Alternatively or additionally, the program code can be tagged when a check rule is triggered. Tagging can be similar to flagging the program code, but with the flag or other information inserted into a tag in the program code.

At 312, code review results can be generated. Generating code review results at 312 can include aggregating the identified portions of code and their associated check rules (e.g. the rules which triggered and caused the portion of code to be identified) from 310. This can include generating a list or other data object which includes or otherwise stores the flags, tags, or other information from executing the check variant at 310.

Additionally or alternatively, summary results can be generated at 312, such as a total count of errors identified (e.g. code portions), a total of check rules triggered, a count of the number of times each check rule in the check variant(s) was triggered, and so on.

Generating the code review results at 312 can include categorizing the individual results based on the check rule triggered, the identified code portion, or both. For example, a particular check rule can be categorized as a warning, and so all code portions which triggered that rule can be listed as warning sections, while another check rule can be categorized as an error, and so all code portions which triggered that rule can be listed as errors.

Generating code review results at 312 can include generating suggestions or proposals to correct or repair the identified code portions. Generating code review results at 312 can include updating a status associated with the target development object based on the code review results. For example, if an error is detected in the program code of the development object, the development object's status can be updated to indicate the error, or general non-compliance.

At 314, the code review results can be provided. Providing code review results at 314 can be performed based, at least in part, on code results variables, such as variables provided as part of the request at 304 or otherwise available in the integrated code inspection framework as described herein. Providing the code review results can include displaying the list of check rules triggered and, in some cases, their categorization. Alternatively or additionally, the identified code portions in the program code of the development object can be displayed, or can be highlighted in a display of the program code. Additional results display can be provided by selection through a user interface (e.g. selecting to view details of a particular error, or selecting to view proposed changes or corrections).

Additionally or alternatively, a report can be provided including the code review results, such as delineating the code portions determined to have triggered one or more check rules. In some embodiments, providing the code review results at 314 can include providing a data structure storing the results through an API, such as to another system, or through a messaging interface.

In some embodiments, the code review results can be provided to a code analyzer for generating proposed changes to correct the code based on the results. Such suggestions can be provided along with the code review results, such as displayed in an IDE.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Figure 4:
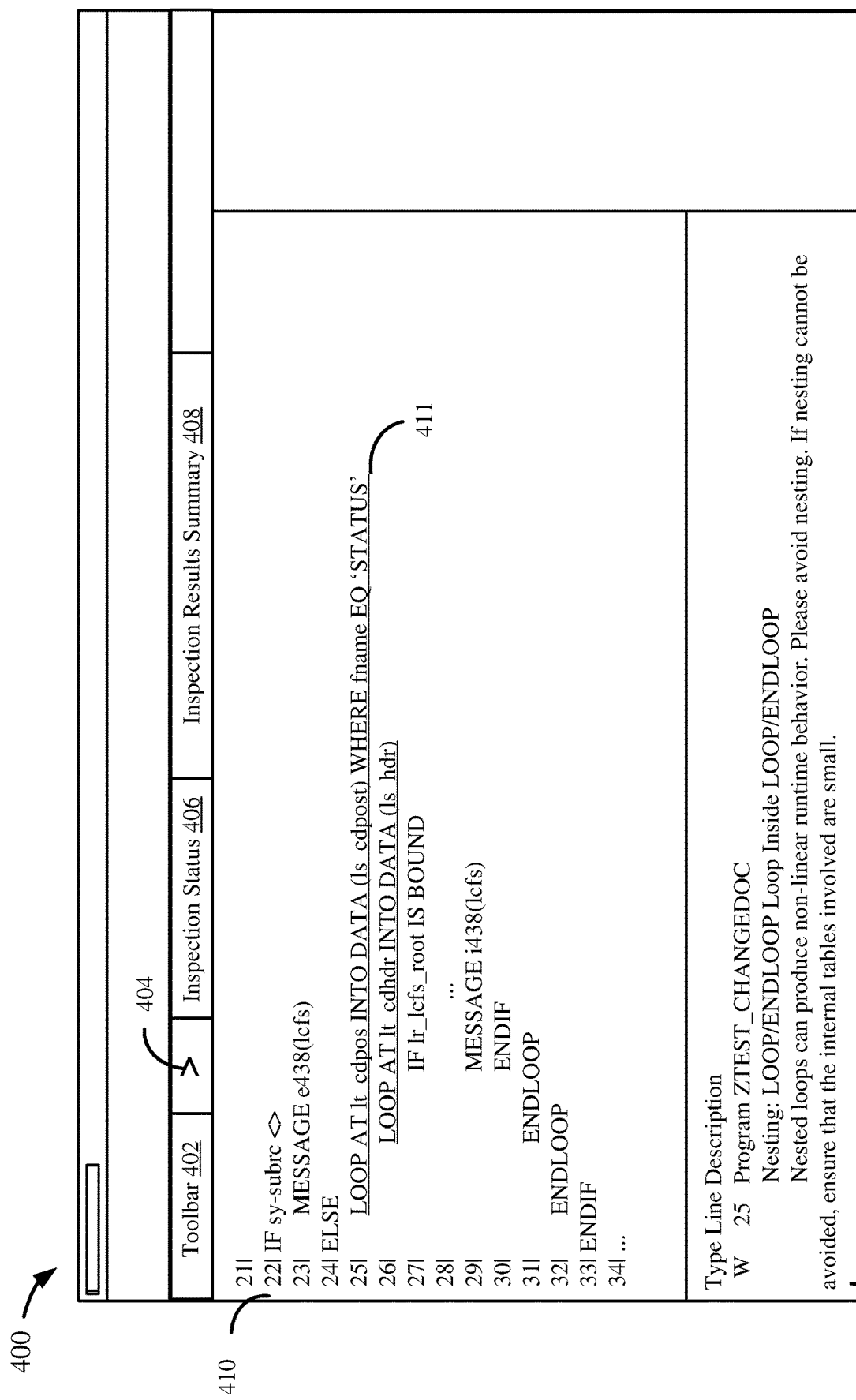
FIG. 4 is an example user interface illustrating how a code inspection framework as described herein can be integrated into a display.

Example 6—Example Integrated Code Inspection Framework with Check Variants Display and Interaction FIG. 4 is an example user interface 400 illustrating how a code inspection framework as described herein can be integrated into a display. The example 400 illustrates, in part, the results of the process 300 shown in FIG. 3.

The user interface 400 can include a toolbar 402, a display of program code for a development object 410, and a display of code details, inspection details, or other information 413.

A user interface 400 can include a toolbar 402, into which can be integrated components of the integrated code inspection framework. A code inspection button or widget 404 can be integrated into a toolbar 402 or otherwise into the display 400. The code inspection button can activate, via a single click, the code inspection process as described herein, such as process 300 shown in FIG. 3. Thus, check variants and code analysis can be readily integrated into a user interface, avoiding execution of check variants via a separate transaction, application, or process.

Additionally or alternatively, the toolbar 402 or display 400 can include an inspection status 406, which can provide the overall review status of the program code currently open 410. For example, the inspection status 406 can provide information such as "Uninspected," "Compliant," or "Non-Compliant." The available statuses and how they are reached can be user configurable, or system configurable.

Additionally or alternatively, the toolbar 402 or display 400 can include an inspection results summary 408. The inspection results summary can include simplified facts about the results of inspection, such as providing the number of errors, number of warnings, and/or the number of additional informational pieces. For example, the summary 408 could indicate "5 errors, 7 warnings, 2 informational items."

The displayed code 410 can be highlighted or otherwise altered to indicate the portions of code attributable to a particular error or warning (e.g. that was triggered by a check rule). For example, the code portion 411 can be underlined (as shown) to indicate that code portion triggered a check rule. Such code could, alternatively or additionally, be highlighted with color around the text, the text color could be changed, and so on. The nature of the highlight can indicate the categorization or type of check rule triggered. For example, errors can display red while warnings can display yellow, and informational items can display green.

The display 400 can include additional details 413 for a selected portion of code 411 (e.g. code with focus or in context). The additional details 413 can specifically identify the error associated with the triggered check rule for the code portion, and other information, such as the categorization and location. Suggestions or proposals to change the code in response to the inspection can also be provided in the additional details 413.

Example 7—Example Development Project, Development Objects, and Program Code

In any of the examples herein, program code can include compile-able source code, interpretable code, a code module, or other computer instructions represented in a programming language. Generally, program code can be source code for an application or a software or code library.

Program code can include portions of code. A portion of code can be identified by the line of code (e.g. as shown at 410 in FIG. 4). A portion of code can also be a code segment, which can be identified based on grammar or syntax of the code. For example, a code segment may end at a semicolon (";") or a period ("."), and the next code segment begin thereafter.

In any of the examples herein, a development object can include a data file, data record (e.g. in a database), or a data structure having program code. For example, a development object can be a file storing program code. Depending on the development environment and programming language(s) used, a development object can include additional files or objects, and additional data, such as references to executable binaries or other functional objects.

In any of the examples herein, a development project can include or define an application or other piece of software, which may have multiple development objects for the program code. A development project can include a data file, data record (e.g. in a database), or a data structure having information, such as development object identifiers, for the software represented by the development project. A development project can identify additional files, executables, data storage, environments, or other software relevant for execution or development of the software represented by the project.

Example 8—Example Check Variants and Check Rules

In any of the examples herein, a check variant can include a data structure or data file (or record) which can identify one or more check rules. A check variant can aggregate check rules in a unit, which can have a particular focus or otherwise indicate a relationship between the check rules. For example, a check variant can include check rules which target correcting syntax for a particular programming language, or which target naming conventions for a particular development project (e.g. as determined by a project manager).

In any of the examples herein, a check rule can include a data file or data structure having a logic statement, such as a first order logic statement or a regular expression, or other programmatic statements (e.g. which evaluate to true or false). A check rule can include one or more fields and one or more operations on the fields. A check rule can include interpretable code for execution, such as by a check variant module as described herein. Generally, a check rule can function as an "if" statement that identifies errors or potential errors in program code.

Generally, check variants and check rules can be pre-defined or user-defined. Check variants and check rules can also be stored and used across development projects, allowing for re-use and encouraging development consistency across projects.

Example 9—Example Categorization of Results

In any of the examples herein, a check rule (or a check variant, in some cases) can have a categorization. Available categorizations can be pre-defined or user-defined. For example, a check rule can be categorized as identifying an error, a warning, or providing additional information. In some cases, the categorization of a triggered check rule can be done on-the-fly during code inspection, as described herein, based on additional factors, such as the development project (e.g. a warning in one project may be an error in another), the particular program code, or the like.

Check rules can be categorized based on the degree of severity of the error the check rule represents or identifies. In some embodiments, the degree of severity of a check rule can be pre-defined or be user-configurable. In other embodiments, the degree of severity can be calculated based on the check rule and other factors of the development object or program code. For example, the development object may be considered a "necessary" or "critical" component, and so the degree of severity of check rules triggered by the development object may be higher than the degree of severity for those same check rules triggered by a "low priority" development object.

Example 10—Example Automatic, Triggered, or Responsive Code Inspection Functionality In any of the examples herein, integrated code inspection functionality, as described herein, can be performed automatically, can be triggered based on one or more inputs, actions, or changes, or can otherwise be responsive to one or more inputs, actions, or changes. An integrated code inspection framework, as described herein, may detect certain inputs, changes, or other actions, and in response to detecting the input(s), action(s), or change(s), perform certain code inspection functionality without requiring further input, user interaction, or system interaction (although more actions, inputs, or changes may be made, in some cases). In this way, the integrated code inspection framework, as described herein, can be responsive to the environment in which it is integrated without requiring explicit user or system direction.

For example, code inspection can be responsive to a change in program code in a development object, such as a change to the context of the program code or a change to the program code itself. In this way, editing the program code can trigger code inspection functionality against the edited program code.

As another example, code inspection can be responsive to the association of a check variant to a development object. In this way, when a new check variant is associated with a development object, code inspection of the development object may be triggered or otherwise automatically initiated (which generally includes execution of at least the new check variant against its associated development object). Such automatic code inspection can be initiated from user-specified check variant association or a check variant cascade based on a hierarchical association between development objects.

As another example, check variant association to a development object can be responsive to the association of the check variant to another, related development object. In this way, check variant association can be triggered based on association of the check variant to a different, related development object, such as related through a hierarchy.

As another example, a change to an existing check variant or check rule can trigger or otherwise automatically cause code inspection of development objects associated with the changed check variant or check rule. In this way, code inspection can be responsive to a change in a check variant or check rule.

Other code inspection functionality, as described herein, can be triggered, automatically initiated, or otherwise engaged responsive to a system or user action, input or context change, or other data changes or processing. For example, process 300 shown in FIG. 3 can be initiated responsive to the association of a check variant to a development object, a change to an associated check variant or check rule, a change to program code or a context of program code (e.g. as displayed), completion of a code inspection (e.g. through the process 300, making the process iterative), or a user response to results of code inspection. Other automatic, triggered, or responsive functionality can be initiated based on or through a user interface, such as shown in FIG. 4.

Example 11—Code Inspection Framework Module Environments

Figure 5A:
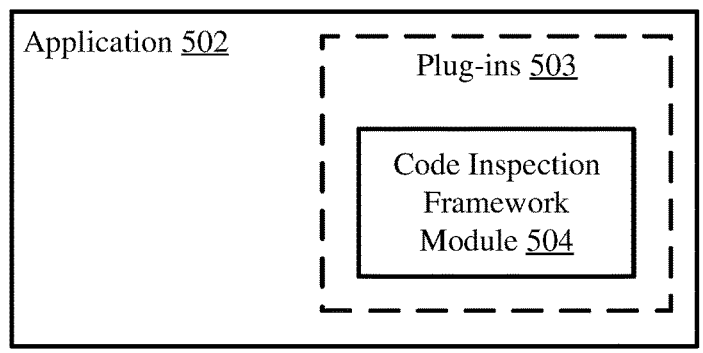
FIG. 5A is an exemplary application environment for a code inspection framework module.

FIG. 5A is a schematic diagram depicting an application environment for a code inspection framework module 504, which may provide code inspection functionality, as described herein. An application 502, such as a software application running in a computing environment, may have one or more plug-ins 503 (or add-ins or other software extensions to programs) that add functionality to, or otherwise enhance, the application. The code inspection framework module 504 may be integrated with the application 502; for example, the code inspection framework module may be integrated as a plug-in. The code inspection framework module 504 may add functionality to the application 502 for code inspection functionality, which may be displayed in a user interface or otherwise provided to a user. For example, the application 502 may be a data/file editor or an integrated development environment, and the code inspection framework module 504 may be integrated with the data/file editor or integrated development environment to provide code inspection functionality.

Figure 5B:
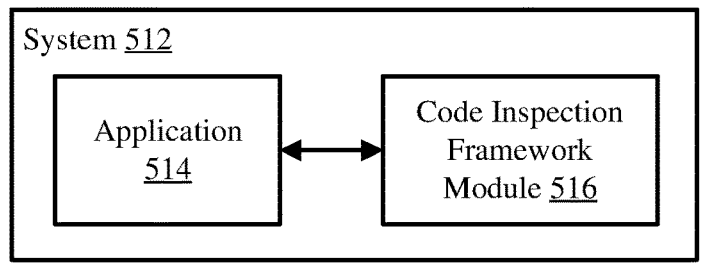
FIG. 5B is an exemplary system environment for a code inspection framework module.

FIG. 5B is a schematic diagram depicting a system environment for a code inspection framework module 516, which may provide code inspection functionality, as described herein. The code inspection framework module 516 may be integrated with a computer system 512. The computer system 512 may include an operating system, or otherwise be a software platform, and the code inspection framework module 516 may be an application or service running in the operating system or platform, or the code inspection framework module may be integrated within the operating system or platform as a service or functionality provided through the operating system or platform. The system 512 may be a server or other networked computer or file system. Additionally or alternatively, the code inspection framework module 516 may communicate with and provide code inspection functionality, as described herein, to one or more applications 514, such as a data/file editor or integrated development environment, in the system 512.

Figure 5C:
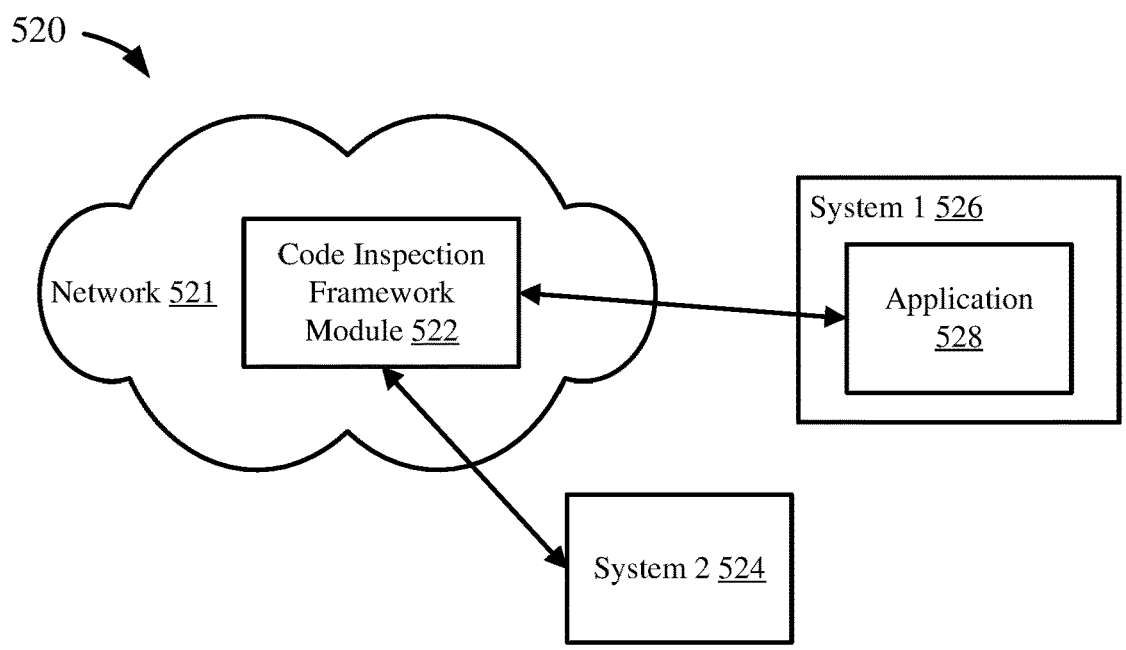
FIG. 5C is an exemplary network environment for a code inspection framework module.

FIG. 5C is a schematic diagram depicting a network environment 520 for a code inspection framework module 522, which may provide code inspection functionality, as described herein. The code inspection framework module 522 may be available on a network 521, or integrated with a system (such as from FIG. 5B) on a network. Such a network 521 may be a cloud network or a local network. The code inspection framework module 522 may be available as a service to other systems on the network 521 or that have access to the network (e.g., may be on-demand software or SaaS). For example, system 2 524 may be part of, or have access to, the network 521, and so can utilize code inspection functionality from the code inspection framework module 522. Additionally, system 1 526, which may be part of or have access to the network 521, may have one or more applications, such as application 528, that may utilize code inspection functionality from the code inspection framework module 522.

In these ways, the code inspection framework module 504, 516, 522 may be integrated into an application, a system, or a network, to provide code inspection functionality, or other check variant analysis functionality, as described herein.

Example 12—Computing Systems

Figure 6:
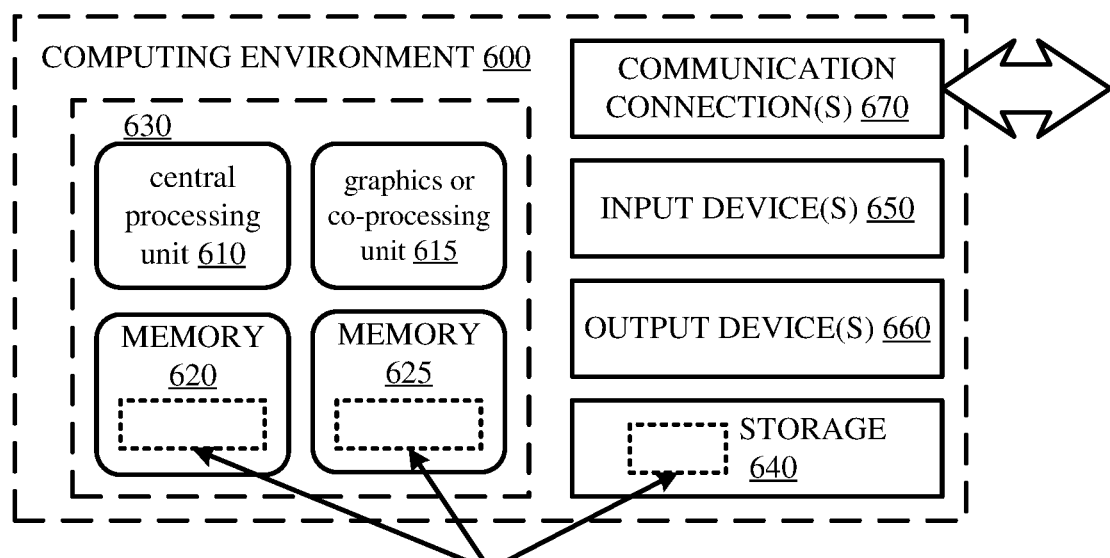
FIG. 6 is a diagram of an example computing system in which described embodiments can be implemented.

FIG. 6 depicts a generalized example of a suitable computing system 600 in which the described innovations may be implemented. The computing system 600 is not intended to suggest any limitation as to scope of use or functionality of the present disclosure, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions, such as for implementing components of the processes of FIG. 3, the systems of FIGS. 1A-B and 5A-C, or the data, data representations, development objects, or data structures of FIG. 2, and the example of FIG. 4. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s) 610, 615. The memory 620, 625 stores software 680 implementing one or more innovations described herein, in the form of computer-executable instructions suitable for execution by the processing unit(s) 610, 615. The memory 620, 625, may also store settings or settings characteristics, databases, data sets, development objects or projects, or examples shown in FIGS. 2 and 4, the systems shown in FIGS. 1A-B and 5A-C, or the steps of the processes shown in FIG. 3.

A computing system 600 may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 7:
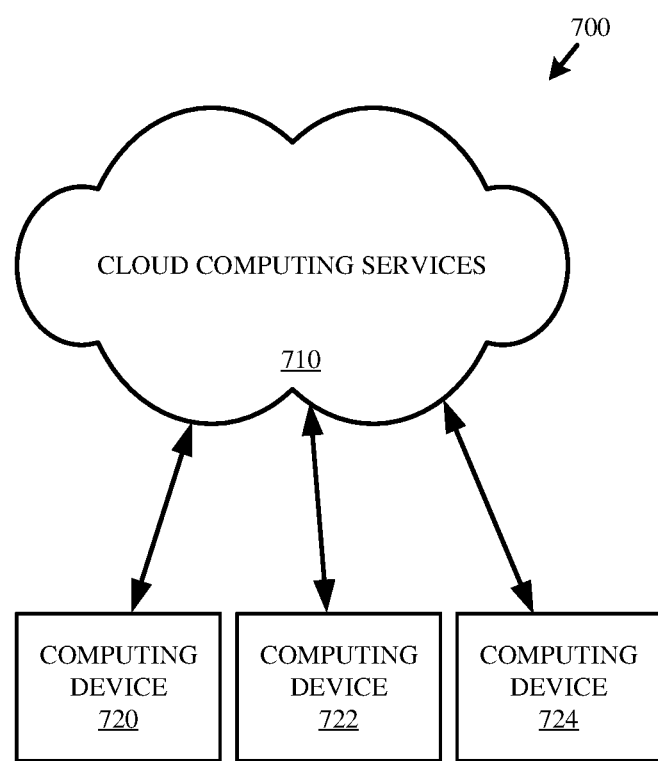
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operations (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware).

Tangible computer-readable storage media can include any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Example 15—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, comprising:
receiving a code review request, wherein the code review request identifies a first development object of a code module, wherein a plurality of development objects comprises the first development object and a plurality of additional, related development objects;
identifying an associated check variant, wherein the check variant comprises one or more code review rules;
executing the check variant against the first development object of the code module to identify code lines which trigger one or more code review rules in the check variant;
storing code line identifiers of the identified code lines and code review rule identifiers of the code review rules triggered by the code lines, wherein a given code line identifier is stored in association with one or more given code review rule identifiers of code review rules triggered by a code line identified by the given code line identifier; and
updating an associated status of the first development object of the code module based on the check variant execution;
wherein the method further comprises:
responsive to setting the check variant for the first development object, cascading the check variant to the additional, related development objects, wherein the cascading is based on a hierarchical relationship between the development objects;
wherein the development objects are deemed related when calling, invoking, incorporating, or otherwise referencing each other; and
wherein a different check variant other than the check variant is set for at least one other development object.

2. The method of claim 1, further comprising:
associating the check variant with the code module based on a hierarchical relationship between the code module and a higher code module, wherein the check variant is associated with the higher code module.

3. The method of claim 1, further comprising:
associating a new check variant with the code module; and
associating the new check variant with one or more additional code modules based on a hierarchical relationship between the code module and the one or more additional code modules.

4. The method of claim 1, further comprising:
accessing the first development object, wherein the check variant is associated with the code module via the development object.

5. The method of claim 1, wherein receiving the code review request triggers a check variant cascade amongst code modules of a development project.

6. The method of claim 1, further comprising:
generating a check variant report, wherein the check variant report comprises the code line identifiers and their associated code review rule identifiers.

7. The method of claim 6, further comprising:
displaying the check variant report.

8. The method of claim 7, further comprising:
displaying the code module; and
wherein displaying the check variant report comprises highlighting code lines of the displayed code module based on the code line identifiers in the check variant report.

9. The method of claim 8, wherein the highlighting of a given code line identifier is based on the associated one or more given code review rule identifiers.

10. The method of claim 1, further comprising:
generating one or more proposed code lines in response to the identified code lines, wherein the one or more proposed code lines do not trigger an associated code review rule of the identified code lines.

11. The method of claim 10, further comprising:
displaying at least one of the one or more generated proposed code lines in conjunction with the code module.

12. The method of claim 1, further comprising:
displaying a results summary comprising a count of the identified code lines.

13. The method of claim 1, further comprising:
categorizing the code lines based on a degree of severity of their respective triggered one or more code review rules.

14. The method of claim 13, further comprising:
displaying the categorization of the code lines.

15. The method of claim 13, wherein the updating of the associated status is based, at least in part, on the categorization of the code lines.

16. The method of claim 1, wherein executing the check variant against the code module comprises applying the one or more code review rules of the check variant against the code module.

17. The method of claim 1, further comprising:
displaying the updated associated status of the first development object of the code module.

18. The method of claim 1, further comprising:
triggering execution of the check variant against the code module based on one or more changes to the code module in response to results of a previous check variant execution; and
updating the associated status of the first development object of the code module based on the triggered check variant execution.

19. One or more non-transitory computer-readable storage media storing computer-executable instructions for causing a computing system to perform operations comprising:
receiving a code review request, wherein the code review request identifies a first development object of a code module, wherein a plurality of development objects comprises the first development object and a plurality of additional, related development objects;
identifying an associated check variant, wherein the check variant comprises one or more code review rules;
executing the check variant against the first development object of the code module to identify code lines which trigger one or more code review rules in the check variant;
storing code line identifiers of the identified code lines and code review rule identifiers of the code review rules triggered by the code lines, wherein a given code line identifier is stored in association with one or more given code review rule identifiers of code review rules triggered by a code line identified by the given code line identifier; and updating an associated status of the first development object of the code module based on the check variant execution;

wherein the operations further comprise:

responsive to setting the check variant for the first development object, cascading the check variant to the additional, related development objects, wherein the cascading is based on a hierarchical relationship between the development objects;

wherein the development objects are related by calling, invoking, or incorporating each other; and wherein a different check variant other than the check variant is set for at least one other development object.

20. A system comprising:

one or more memories;

one or more processing units coupled to the one or more memories; and one or more computer-readable storage media storing instructions that, when loaded into the one or more memories, cause the one or more processing units to perform operations comprising:

receiving a code review request, wherein the code review request identifies a first development object of a code module, wherein a plurality of development objects comprises the first development object and a plurality of additional, related development objects;

identifying an associated check variant, wherein the check variant comprises one or more code review rules;

executing the check variant against the first development object of the code module to identify code lines which trigger one or more code review rules in the check variant;

storing code line identifiers of the identified code lines and code review rule identifiers of the code review rules triggered by the code lines, wherein a given code line identifier is stored in association with one or more given code review rule identifiers of code review rules triggered by a code line identified by the given code line identifier; and updating an associated status of the first development object of the code module based on the check variant execution;

wherein the operations further comprise:

responsive to setting the check variant for the first development object, cascading the check variant to the additional, related development objects, wherein the cascading is based on a hierarchical relationship between the development objects;

wherein the development objects are related by calling, invoking, or incorporating each other;

wherein the development objects comprise data files, data records, or data structures having program code; and wherein a different check variant other than the check variant is set for at least one other development object.

* * * * *